United States Patent Office 3,078,912
Patented Feb. 26, 1963

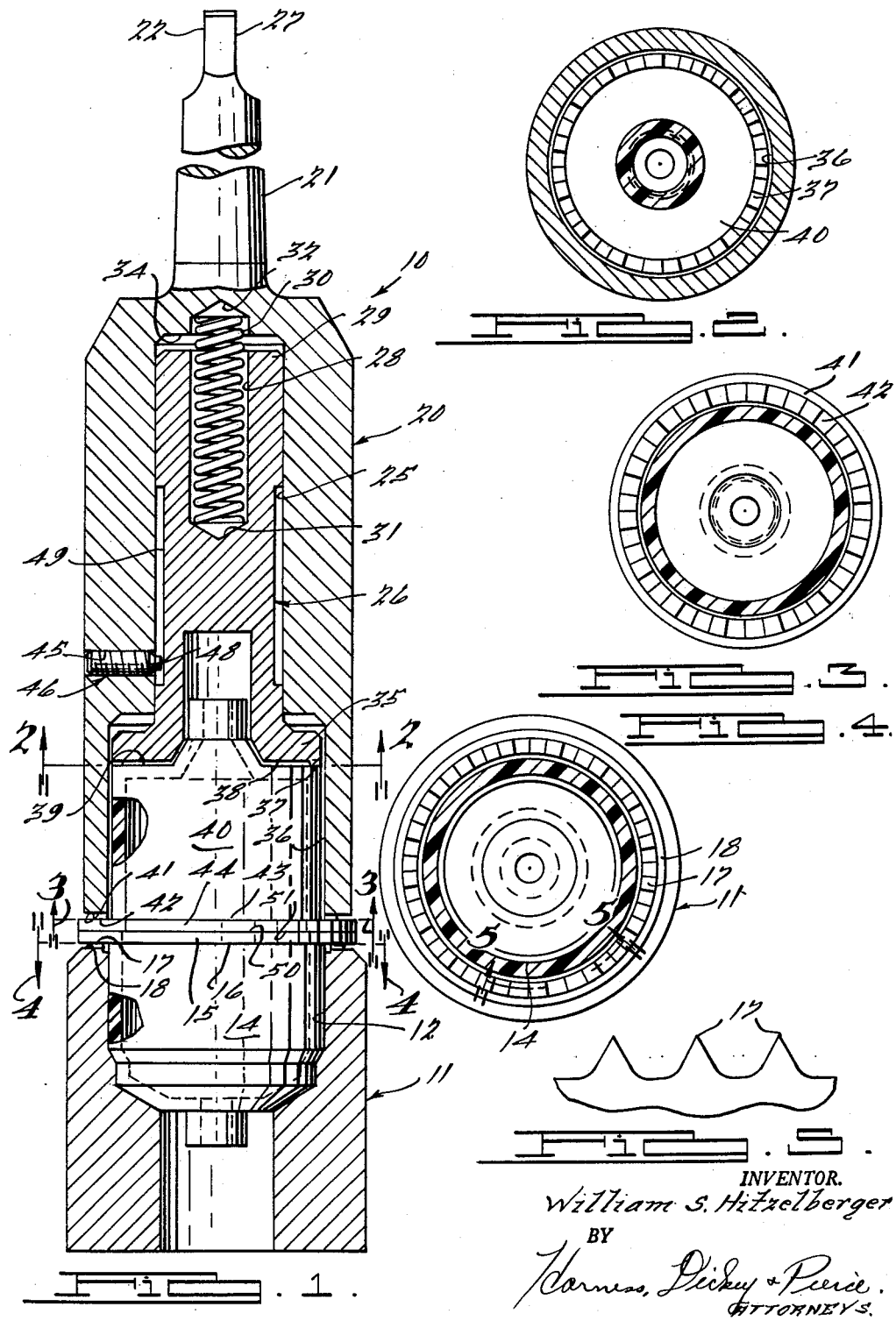

3,078,912
SPINNING TOOL
William S. Hitzelberger, Racine, Wis., assignor to Walker Manufacturing Company, Racine, Wis., a corporation of Delaware
Filed Sept. 16, 1959, Ser. No. 840,427
5 Claims. (Cl. 156—582)

This invention relates to a novel tool and method for joining plastic members to form a composite plastic article.

A number of methods have been heretofore proposed for joining plastic members to form a composite article. It has been proposed to join plastic members by first plasticizing the members, as by high frequency electrical heating or other external heating devices, and then compressing the members to effect a junction. Also, it has been proposed to use resin cements containing volatile solvents to effect a chemical bond between the plastic members, or, alternatively, to use nonsolvent body cements that function as an adhesive medium between the members.

However, the above expediences are not completely satisfactory solutions to the aforementioned problem because each is either relatively expensive or disrupts the mechanical or chemical integrity or homogeneity of the plastic adjacent the junction. The use of complex heating equipment in conjunction with pressure results in excessive tool and production costs, tending to increase the cost of the finished article. The use of resin or body cements results either in a chemical change or in the addition of a foreign material to the composite article. Also, the use of solvents or adhesives often results in excessive adhesive flowage unless the application thereof is carefully controlled.

The present invention is directed to a novel tool and process for effecting a junction between plastic members by utilizing the heat of friction between the two articles, as they more relative to one another under compression, to plasticize the juxtaposed engaging surfaces of the articles and thereby effect the junction.

Accordingly, one object of the present invention is to provide a tool for joining plastic articles (such as parts made of nylon) to one another.

Another object is to provide a tool for spinning one article with respect to another article.

Another object is to provide a tool for rotating plastic articles with respect to one another whereby the articles are joined due to the heat of friction and to pressure applied thereto by the tool.

Another object is to provide a tool in accordance with the aforementioned objects that does not require a clutch or braking means.

Another object is to provide an improved method of bonding plastic articles.

Other objects and advantages of the present invention will become apparent from the following description wherein reference is made to the drawings, in which:

FIGURE 1 is a sectional, fragmentary vertical elevation of the spinning tool of the present invention shown in the driving position;

FIG. 2 is a cross-sectional view taken substantially along the line 2—2 of FIG. 1;

FIG. 3 is a cross-sectional view taken substantially along the line 3—3 of FIG. 1;

FIG. 4 is a cross-sectional view taken substantially along the line 4—4 of FIG. 1; and FIG. 5 is a fragmentary view of the teeth or serrations taken along the line 5—5 of FIG. 4.

Referring to FIG. 1, a tool 10 in accordance with an exemplary embodiment of the present invention comprises a base member 11 having a central bore or cavity 12 therein for the acceptance of a plastic member 14, for example a plastic cup or shell. The plastic member 14 preferably is closely supported within the central bore 12 as by a working or press fit. The plastic member 14 has an annular flange 15 at the upper end thereof having a lower surface 16 engageable by a plurality of serrations or teeth 17 on an upper peripheral end face 18 of the base member 11.

A driving head 20 having an upwardly extending tapered shank 21 with parallel flats 22 and 24 for engagement with a suitable rotating machine, for example a drill press (not shown) is mounted in aligned relationship above the base member 11. The driving head 20 has an axially extending central bore 25 for the acceptance of a longitudinally reciprocable pressure head 26. The pressure head has a central bore 28 at an upper end 29 thereof for the acceptance of a helical compression spring 30 that extends between a bottom face 31 of the bore 28 and a spring retainer recess 32 in an upper end face 34 of the central bore 25 in the driving head 20. The spring 30 normally biases the pressure head 26 outwardly of the bore 25 in the driving head 20.

The pressure head 26 has a radially outwardly extending flange or pressure pad 35 at the lower end thereof that is accepted in a counterbore or cavity 36 in the driving head 20. The pressure pad 35 has a plurality of serrations or teeth 37 that extend downwardly from a lower peripheral end face 38 on the pad 35 for engagement with an upper end face 39 on an upper plastic member 40.

A lower annular end face 41 on the driving head 20, defined by the outer periphery of the driving head 20 and the counterbore 36 therein, is provided with a plurality of serrations or teeth 42 for driving engagement with an upper surface 43 on a radially outwardly extending flange 44 on the upper plastic member 40.

The driving head 20 has a laterally extending threaded bore 45 for the acceptance of a setscrew 46. The setscrew 46 has a head portion 48 that is accommodated within an annular peripheral recess 49 in the pressure head 26 to retain the pressure head 26 within the bore 25 in the driving head 20.

In accordance with the present invention, the plastic members 14 and 40 are joined by first inserting the member 14 in the cavity or bore 12 in the base member 11. The upper teeth 17 on the end face 18 of the base member 11 are engaged with the bottom surface 16 on the flange 15 on the lower plastic member 14.

The upper plastic member 40 is placed on top of the lower member 14 with the flanges 44 and 15 thereof, respectively, in aligned juxtaposed relationship. The normally rotating driving head 20, which may be controlled automatically or manually as by a foot pedal or other suitable control (not shown) is caused to descend bringing thereby the teeth 37 on the pressure head 26 into engagement with the upper end face 39 of the upper plastic member 40 under the bias of the spring 30. The spring 30 is of sufficient length to cause engagement of the teeth 37 with the end face 39 before engagement of the teeth 42 on the driving head 20 with the upper surface 43 of the flange 44 on the upper plastic member 40. Because the pressure head 26 is spring loaded with respect to the driving head 20, the pressure head 26 biases the plastic members 40 and 14 against one another independently of engagement of the teeth 42 on the head 20 with the plastic member 40.

The driving head 20 is then lowered further so as to cause the teeth 42 on the lower annular end face 41 thereof to engage the upper surface 43 of the radially outwardly extending flange 44 on the upper plastic member 40. Such engagement causes the upper plastic member 40 to rotate with respect to the lower member 14 while being biased thereagainst by the pressure head 26. Relative rotation between the plastic members 14 and 40 is maintained for a period of time, at a rotational speed dependent upon the diameter, surface area and the cross-sectional area of the flanges 15 and 44 thereof, respectively, sufficient to liquefy the juxtaposed surfaces 50 and 51 of the flanges 15 and 44, respectively. Upon liquification of the surfaces 50 and 51, the driving head 20 is retracted sufficiently to disengage the teeth 42 thereon from the flange 44, thereby stopping rotation of the upper plastic member 40 and to maintain the pressure head 26 in contact with the plastic member 40 to bias the members 40 and 14 together. This continued pressure effects a seal between the liquefied contacting surfaces 50 and 51 of the flanges 15 and 44, respectively.

Because the driving head 20 is rotatable with respect to the pressure head 26, no brake, clutch, or other stopping device is required to stop rotation of the pressure head 26 upon disengagement of the teeth 42 on the driving head 20 from the plastic member 40. Upon retraction of the driving head 20, the pressure head 26 ceases to rotate and functions solely to bias the plastic members 14 and 40 against one another.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A tool for joining a pair of plastic members comprising a base having a recess for the acceptance of one of said members and a plurality of teeth engageable with said member for restricting relative rotation therebetween, a rotatable driving head having a recess for the acceptance of the other of said plastic members and a plurality of teeth releasably engageable with the other of said plastic members, a pressure head within said driving head and engageable with said other plastic member, and a compression spring extending between said driving head and pressure heads for biasing said pressure head against said other plastic member independently of engagement between said driving head and said other plastic member.

2. A tool for joining a pair of plastic members having a peripheral flange thereon comprising a base having a recess for the acceptance of one of said members and a plurality of teeth engageable with the flange on said one member for restricting relative rotation between said base and member, a rotatable driving head having a recess for the acceptance of the other of said plastic members and a plurality of teeth releasably engageable with the flange on the other of said plastic members, a pressure head within said driving head and engageable with said other plastic member to bias said flanges together, and a compression spring extending between said driving head and pressure heads for biasing said pressure head against said other plastic member independently of engagement between said driving head and said other plastic member.

3. A tool for joining a pair of plastic members comprising a base having a recess for the acceptance of one of said members and a plurality of teeth engageable with said one member for restricting relative rotation therebetween, a rotatable driving head having a recess opposed to the recess in said base for the acceptance of the other of said plastic members and a plurality of teeth releasably engageable with the other of said plastic members, a pressure head within said driving head and engageable with said other plastic member, and a compression spring extending between said driving head and pressure heads for biasing said pressure head against said other plastic member independently of engagement between said driving head and said other plastic member.

4. A tool for joining a pair of plastic members comprising a base having a recess for the acceptance of one of said members and a plurality of teeth engageable with said one member for restricting relative rotation therebetween, a rotatable driving head having a recess in aligned relation with the recess in said base for the acceptance of the other one of said plastic members and a plurality of teeth releasably engageable with said other one of said plastic members, a pressure head within said driving head having a plurality of teeth engageable with said other plastic member, and a compression spring extending between said driving head and pressure heads for biasing said pressure head against said other plastic member independently of engagement between said driving head and said other plastic member.

5. A tool for joining a pair of plastic members of circular configuration, each of said members having a radially outwardly extending peripheral flange, said tool comprising a base having a circular recess for the acceptance of one of said members and a plurality of teeth engageable with the peripheral flange on said one member for restricting relative rotation therebetween, a rotatable driving head to effect relative rotation between said members having a circular recess for the acceptance of the other one of said plastic members and a plurality of teeth releasably engageable with the peripheral flange on said other one of said plastic members, a pressure head within said driving head having a circular portion within said driving head recess with a plurality of teeth thereon and engageable with said other plastic member, and resilient means extending between said driving head and pressure heads for biasing said pressure head against said other plastic member independently of engagement between said driving head and said other plastic member.

References Cited in the file of this patent

UNITED STATES PATENTS

| | | |
|---|---|---|
| 1,841,938 | Davis | Jan. 19, 1932 |
| 2,488,624 | Greaves | Nov. 22, 1949 |
| 2,691,402 | Swanson | Oct. 12, 1954 |
| 2,839,441 | Kent | June 17, 1958 |
| 2,853,118 | Schnitzius | Sept. 23, 1958 |
| 2,929,134 | Mosher | Mar. 22, 1960 |
| 2,933,428 | Mueller | Apr. 19, 1960 |
| 2,956,611 | Jendrisak | Oct. 18, 1960 |

OTHER REFERENCES

Fabrication With Frictional Heat, Robert N. Freres, Modern Plastics, November 1945, pages 142–145.